США010655507B2

(12) United States Patent
Shimizu

(10) Patent No.: US 10,655,507 B2
(45) Date of Patent: May 19, 2020

(54) CONTROL DEVICE AND CONTROL METHOD FOR INTERNAL COMBUSTION ENGINE

(71) Applicant: Hitachi Automotive Systems, Ltd., Hitachinaka-shi, Ibaraki (JP)

(72) Inventor: Hirokazu Shimizu, Isesaki (JP)

(73) Assignee: Hitachi Automotive Systems, Ltd., Hitachinaka-shi (JP)

( * ) Notice: Subject to any disclaimer, the term of this patent is extended or adjusted under 35 U.S.C. 154(b) by 0 days.

(21) Appl. No.: 16/332,925

(22) PCT Filed: Dec. 15, 2017

(86) PCT No.: PCT/JP2017/045169
§ 371 (c)(1),
(2) Date: Mar. 13, 2019

(87) PCT Pub. No.: WO2018/135202
PCT Pub. Date: Jul. 26, 2018

(65) Prior Publication Data
US 2019/0249574 A1    Aug. 15, 2019

(30) Foreign Application Priority Data
Jan. 20, 2017   (JP) ................. 2017-008791

(51) Int. Cl.
*F01L 1/34*      (2006.01)
*F01L 1/344*     (2006.01)
(Continued)

(52) U.S. Cl.
CPC ............. *F01L 1/344* (2013.01); *F01L 1/356* (2013.01); *F02D 13/02* (2013.01); *F02D 41/009* (2013.01);
(Continued)

(58) Field of Classification Search
CPC .. F02D 41/222; F02D 2041/001; F01L 1/344; F01L 1/356
(Continued)

(56) References Cited

U.S. PATENT DOCUMENTS 7,398,751 B2 * 7/2008 Kadowaki ............. F01L 1/3442
123/15

FOREIGN PATENT DOCUMENTS

JP    7-233714 A    9/1995
JP   11-141387 A    5/1999
(Continued)

OTHER PUBLICATIONS

International Preliminary Report on Patentability (PCT/IB/338 & PCT/IPEA/409) issued in PCT Application No. PCT/JP2017/045169 dated Aug. 22, 2019 (13 pages).
(Continued)

*Primary Examiner* — Ching Chang
(74) *Attorney, Agent, or Firm* — Crowell & Moring LLP

(57) ABSTRACT

In a control device and a control method for an internal combustion engine according to the present invention, when a crank angle signal is behaving abnormally, a phase angle of an exhaust camshaft relative to a crankshaft is set to a reference phase angle, and a phase angle of an intake camshaft relative to the crankshaft is determined based on an intake cam signal and an exhaust cam signal. Furthermore, the phase difference between the exhaust cam signal generated when the relative phase angle of the exhaust camshaft is set to the reference phase angle and the intake cam signal generated when the relative phase angle of the intake camshaft is set to a target value is greater after a start-up of the internal combustion engine than during the start-up.

6 Claims, 10 Drawing Sheets

(51) Int. Cl.
*F02D 41/00* (2006.01)
*F02D 43/04* (2006.01)
*F16H 35/00* (2006.01)
*F02D 13/02* (2006.01)
*F02D 41/06* (2006.01)
*F01L 1/356* (2006.01)
*F02D 41/22* (2006.01)

(52) U.S. Cl.
CPC ........... *F02D 41/062* (2013.01); *F02D 43/04* (2013.01); *F16H 35/008* (2013.01); *F02D 41/222* (2013.01); *F02D 2041/001* (2013.01); *Y02T 10/18* (2013.01)

(58) Field of Classification Search
USPC .......................................... 123/90.15, 90.17
See application file for complete search history.

(56) References Cited

FOREIGN PATENT DOCUMENTS

| | | |
|---|---|---|
| JP | 2013-24065 A | 2/2013 |
| JP | 2013-217339 A | 10/2013 |

OTHER PUBLICATIONS

International Search Report (PCT/ISA/210) issued in PCT Application No. PCT/JP2017/045169 dated Mar. 20, 2018 with English translation (five (5) pages).

Japanese-language Written Opinion (PCT/ISA/237) issued in PCT Application No. PCT/JP2017/045169 dated Mar. 20, 2018 (six (6) pages).

Japanese-language Office Action issued in counterpart Japanese Application No. 2017-008791 dated Nov. 5, 2019 with English translation (13 pages).

\* cited by examiner

CONTROL DEVICE AND CONTROL METHOD FOR INTERNAL COMBUSTION ENGINE

TECHNICAL FIELD

The present invention relates to a control device and to a control method for an internal combustion engine, and specifically relates to a technique for controlling variable valve timing mechanisms, each of which variably controls the phase angle of the corresponding camshaft relative to the crankshaft.

BACKGROUND ART

Patent Document 1 discloses a control device for an internal combustion engine including: a variable intake valve timing mechanism; a variable exhaust valve timing mechanism; a lock mechanism configured to lock the intake valve timing at a point; a crank angle sensor configured to output a crank angle signal; an intake cam sensor configured to output an intake cam signal; and an exhaust cam sensor configured to output an exhaust cam signal. In the disclosure of Patent Document 1, when an abnormality occurs in the crank angle sensor, the control device controls the operation of the variable intake valve timing mechanism based on the exhaust cam signal to enable the lock feature of the lock mechanism and controls the engine based on an estimated crank angle that is calculated based on the intake cam signal.

REFERENCE DOCUMENT LIST

Patent Document

Patent Document 1: JP 2013-217339 A

SUMMARY OF THE INVENTION

Problem to be Solved by the Invention

In this connection, the crank angle signal may be output for each predetermined crank angle degree, such as 10 degrees, and the intake cam signal and exhaust cam signal may be output for each crank angle degree that correspond to a stroke phase difference between cylinders (for example, every 180 degrees of crank angle for a four-cylinder engine). In this case, the engine rotation speed determination frequency based on the intake or exhaust cam signal is less than that based on the crank angle signal.

Thus, when the crank angle signal is behaving abnormally and the control device determines the engine rotation speed based on the intake or exhaust cam signal, the accuracy of conversion of the time of phase difference into a crank angle based on the engine rotation speed deteriorates, particularly during the engine start-up in which the engine rotation speed (angular velocity) changes greatly. For this reason, when the crank angle signal is behaving abnormally and the control device controls the variable valve timing mechanisms based on the intake cam signal and exhaust cam signals, the control device may control the variable valve timing mechanisms with an accuracy reduced by deterioration in the determination accuracy of the relative phase angles during the start-up of the internal combustion engine. This may deteriorate the start-up performance of the internal combustion engine.

The present invention has been made in view of the above problem, and an object of the present invention is to provide a control device and a control method for an internal combustion engine that are capable of suppressing deterioration in the determination accuracy of the relative phase angle, thus suppressing deterioration in the control accuracy of the variable valve timing mechanisms when the crank angle signal is behaving abnormally.

Means for Solving the Problem

To this end, a control device for an internal combustion engine configured such that each of the intake cam signal and the exhaust cam signal has a period longer than a period of the crank angle signal according to an aspect of the present invention includes a control means configured to: control the variable intake valve timing mechanism based on the crank angle signal and the intake cam signal, when the crank angle signal is behaving normally; and control the variable intake valve timing mechanism based on the intake cam signal and the exhaust cam signal while controlling the variable exhaust valve timing mechanism so as to set the relative phase angle of the exhaust camshaft to a reference phase angle, when the crank angle signal is behaving abnormally, wherein a phase difference between the exhaust cam signal generated when the relative phase angle of the exhaust camshaft is set to the reference phase angle and the intake cam signal generated when the relative phase angle of the intake camshaft is set to a target value is greater after a start-up of the internal combustion engine than during the start-up, and wherein the phase difference during the start-up of the internal combustion engine is less than or equal to the period of the crank angle signal.

Furthermore, a control method for an internal combustion engine configured such that each of the intake cam signal and the exhaust cam signal has a period longer than a period of the crank angle signal according to an aspect of the present invention includes the steps of: detecting whether the crank angle signal is behaving normally or abnormally; controlling the variable intake valve timing mechanism based on the crank angle signal and the intake cam signal, when the crank angle signal is behaving normally; controlling the variable exhaust valve timing mechanism based on the crank angle signal and the exhaust cam signal, when the crank angle signal is behaving normally; controlling the variable exhaust valve timing mechanism so as to set the relative phase angle of the exhaust camshaft to a reference phase angle, when the crank angle signal is behaving abnormally; and controlling the variable intake valve timing mechanism based on the intake cam signal and the exhaust cam signal, when the crank angle signal is behaving abnormally, wherein a phase difference between the exhaust cam signal generated when the relative phase angle of the exhaust camshaft is set to the reference phase angle and the intake cam signal generated when the relative phase angle of the intake camshaft is set to a target value is greater after a start-up of the internal combustion engine than during the start-up, and wherein the phase difference during the start-up of the internal combustion engine is less than or equal to the period of the crank angle signal.

Effects of the Invention

According to the invention as described above, the phase difference between the exhaust cam signal and the intake cam signal is reduced during the start-up of the internal combustion engine in which the crank angle signal is behaving abnormally. Accordingly, the present invention allows suppressing deterioration in the determination accuracy of the relative phase angles and thus suppressing deterioration in the control accuracy of the variable exhaust valve timing mechanism when the crank angle signal is behaving abnormally.

MODE FOR CARRYING OUT THE INVENTION

Figure 1:
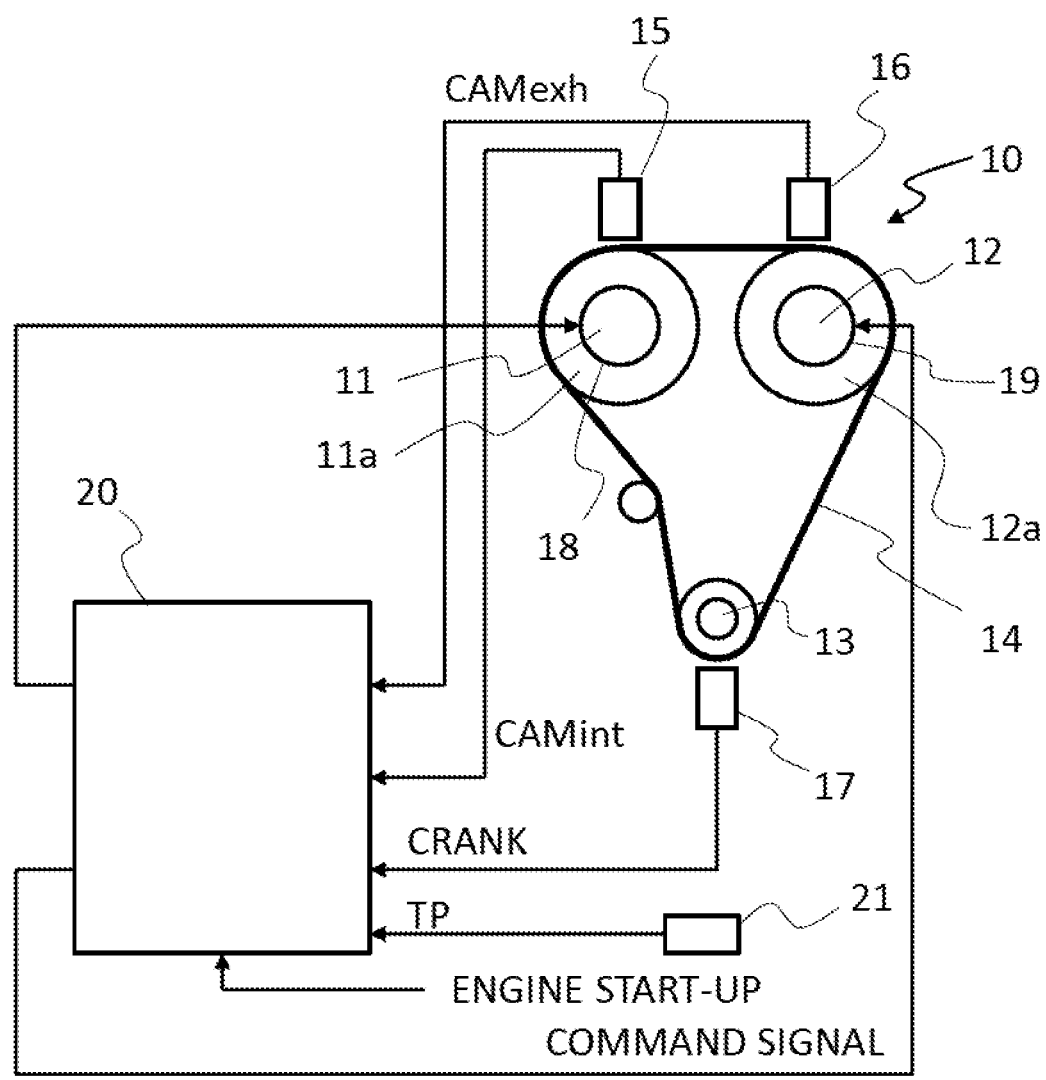
FIG. 1 illustrates a system configuration of an internal combustion engine according to an embodiment of the present invention.

An embodiment of the present invention will be described below. FIG. 1 illustrates a system configuration of an embodiment of an internal combustion engine for a vehicle to which the present invention is applied. In FIG. 1, an internal combustion engine 10 includes an intake camshaft 11, an exhaust camshaft 12, and a crankshaft 13. Intake camshaft 11 integrally includes a cam for opening and closing an intake valve (not illustrated in the drawings). Exhaust camshaft 12 integrally includes a cam for opening and closing an exhaust valve (not illustrated in the drawings).

A pulley 11a is pivotally supported at an end of intake camshaft 11. A pulley 12a is pivotally supported at an end of exhaust camshaft 12. Upon receiving a torque from crankshaft 13 via a timing belt 14 wound around pulleys 11a, 12a, intake camshaft 11 and exhaust camshaft 12 rotate to open and close the intake valve and exhaust valve, respectively. In this embodiment, internal combustion engine 10 is a four-stroke inline four-cylinder engine.

Figure 2:
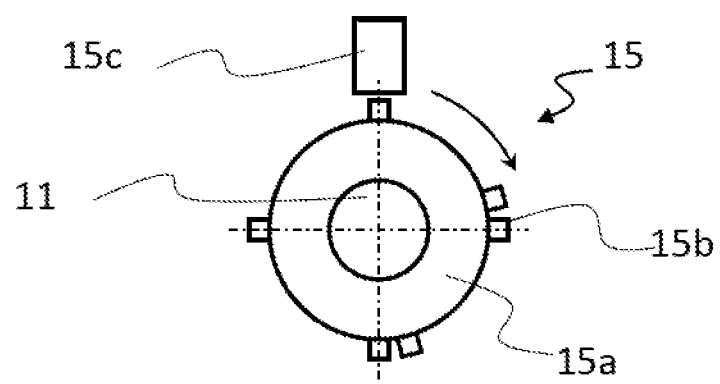
FIG. 2 illustrates a configuration of an intake cam sensor according to an embodiment of the present invention.

Intake camshaft 11 is provided with an intake cam sensor 15 for outputting an intake cam signal CAMint at a predetermined rotational position of intake camshaft 11. Exhaust camshaft 12 is provided with an exhaust cam sensor 16 for outputting an exhaust cam signal CAMexh at a predetermined rotational position of exhaust camshaft 12. As illustrated in FIG. 2, intake cam sensor 15 includes a signal plate 15a pivotally supported at an end of intake camshaft 11, and a pickup 15c configured to output a pulse signal upon detecting any of protrusions 15b provided on the periphery of signal plate 15a.

Figure 3:
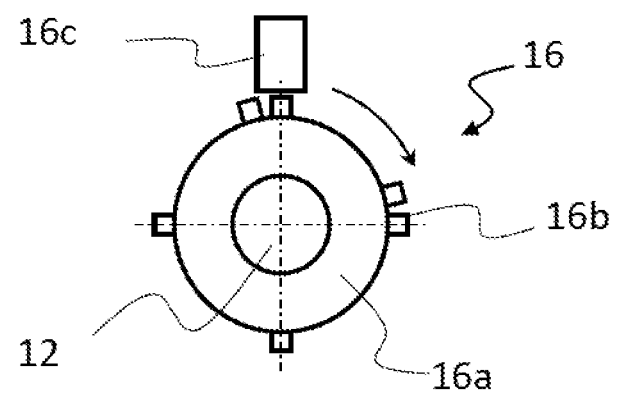
FIG. 3 illustrates a configuration of an exhaust cam sensor according to an embodiment of the present invention.

Similarly, as illustrated in FIG. 3, exhaust cam sensor 16 includes a signal plate 16a pivotally supported at an end of exhaust camshaft 12, and a pickup 16c configured to output a pulse signal upon detecting any of protrusions 16b provided on the periphery of signal plate 16a. As illustrated in FIG. 2, on signal plate 15a of intake cam sensor 15, protrusions 15b are provided at four places each corresponding to every 90 degrees of rotation angle of intake camshaft 11 (corresponding to every 180 degrees of rotation angle of crankshaft 13). Specifically, one protrusion 15b is provided at each of adjacent two of these four places located 90 degrees apart, and two protrusions 15b are provided at each of the other two of these four places.

Figure 5:
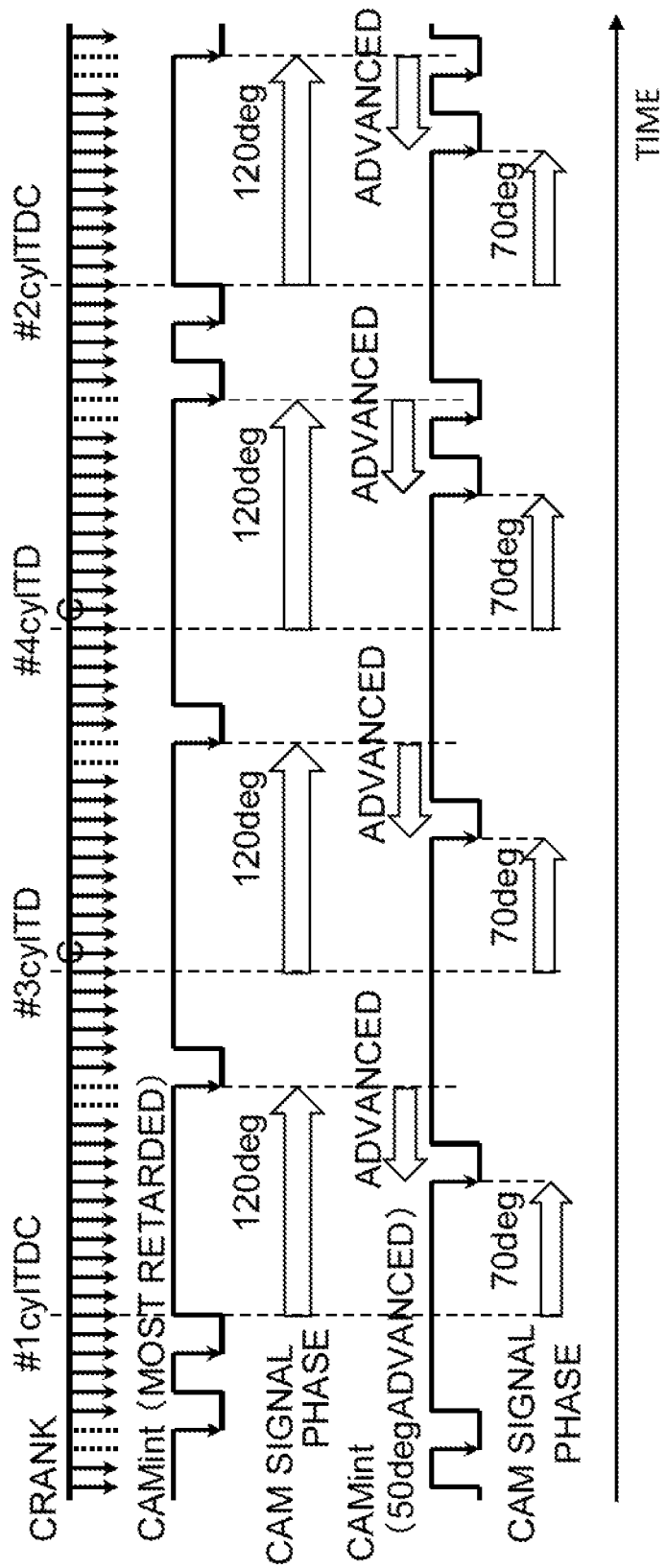
FIG. 5 is a time chart illustrating output characteristics of an intake cam signal CAMint, an exhaust cam signal CAMexh, and a crank angle signal CRANK according to an embodiment of the present invention.

Note that 90 degrees in rotation angle of intake camshaft 11, i.e., 180 degrees in rotation angle of crankshaft 13, corresponds to a stroke phase difference between cylinders in four-stroke inline four-cylinder internal combustion engine 10 of this embodiment. In other words, in internal combustion engine 10, the ignition timings of the first to fourth cylinders are shifted in phase by 180 degrees of crank angle in the 720-degree crank angle rotation so that the ignition timings for the first, third, fourth, and second cylinders are set at even intervals in this order. The intake cam signal CAMint, which is a pulse signal output by intake cam sensor 15, falls for a predetermined period each time any protrusion 15b is detected. Specifically, as illustrated in FIG. 5, the intake cam signal CAMint falls upon each 90-degree rotation of intake camshaft 11 such that one falling period (one pulse), one falling period (one pulse), two falling periods (two pulses), and two falling periods (two pulses) are repeated in this order.

Similarly, as illustrated in FIG. 3, on signal plate 16a of exhaust cam sensor 16, protrusions 16b are provided at four places, each corresponding to a 90 degree rotation angle of exhaust camshaft 12 (corresponding to 180-degree rotation angle of crankshaft 13). Specifically, one protrusion 16b is provided at each of adjacent two of these four places located 90 degrees apart, and two protrusions 16b are provided at each of the other two of these four places. The exhaust cam signal CAMexh, which is a pulse signal output by exhaust cam sensor 16, falls for a predetermined period each time any protrusion 16b is detected. Specifically, as illustrated in FIG. 5, the exhaust cam signal CAMexh falls upon each 90-degree rotation of exhaust camshaft 12 such that one falling period (one pulse), one falling period (one pulse), two falling periods (two pulses), and two falling periods (two pulses) are repeated in this order.

Figure 4:
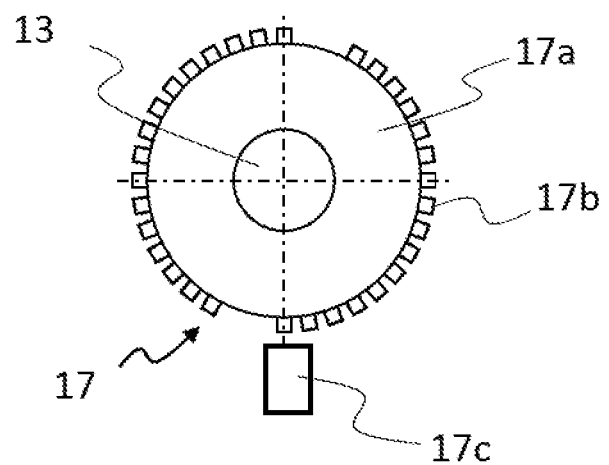
FIG. 4 illustrates a configuration of a crank angle sensor according to an embodiment of the present invention.

Crankshaft 13 is provided with a crank angle sensor 17 for outputting a crank angle signal CRANK at a predetermined rotational position of crankshaft 13. As illustrated in FIG. 4, crank angle sensor 17 includes a signal plate 17a pivotally supported at an end of crankshaft 13, a pickup 17c configured to output a pulse signal upon detecting any of protrusions 17b provided on the periphery of signal plate 17a.

On signal plate 17a of crank angle sensor 17, a protrusion 17b is provided at a place corresponding to a predetermined rotation angle degree (10 degrees, for example) of crankshaft 13, except at two pairs of adjacent places corresponding to a 180-degree rotation of crank angle. The crank angle signal CRANK, which is a pulse signal output by crank angle sensor 17, falls for a predetermined period each time any protrusion 17b is detected, and thus detects each predetermined rotation angle degree of crankshaft 13.

In this embodiment, the predetermined angle degree may be set to 10 degrees. As illustrated in FIG. 5, the crank angle signal CRANK repeats a pattern in which the crank angle signal CRANK falls every 10 degrees of crank angle for 16 consecutive times; then holds a high level as if two falling periods are skipped; then falls every 10 degrees of crank angle for 16 consecutive times; and holds the high level again as if two falling periods are skipped. The places at which pulses of the crank angle signal CRANK are generated (the places corresponding to the falling edges as well as the non-pulse regions) are adjusted such that each place corresponding to the (predetermined number)-th falling edge (generated pulse) from each of the non-pulse regions matches the position of the intake top dead center (TDC) of each cylinder.

Furthermore, internal combustion engine 10 includes a variable intake valve timing mechanism 18 and a variable exhaust valve timing mechanism 19. Variable intake valve timing mechanism 18 continuously advances or retards the center phase of the operation angle of the intake valve while holding the operation angle of the intake valve constant, by variably controlling the phase angle of intake camshaft 11 relative to crankshaft 13. Variable exhaust valve timing mechanism 19 continuously advances or retards the center phase of the operation angle of the exhaust valve while holding the operation angle of the exhaust valve constant, by variably controlling the phase angle of exhaust camshaft 12 relative to crankshaft 13. When variable intake valve timing mechanism 18 is activated and changes the phase angle of intake camshaft 11 relative to crankshaft 13, the phase angle of the intake cam signal CAMint changes relative to the crank angle signal CRANK accordingly. Similarly, when variable exhaust valve timing mechanism 19 is activated and changes the phase angle of exhaust camshaft 12 relative to crankshaft 13, the phase angle of the exhaust cam signal CAMexh changes relative to the crank angle signal CRANK accordingly.

A known variable valve timing mechanism such as an electric or hydraulic variable valve timing mechanism may be appropriately used as each of variable intake valve timing mechanism 18 and variable exhaust valve timing mechanism 19. For example, one of them may be an electric variable valve timing mechanism, and the other may be a hydraulic variable valve timing mechanism. Each of variable intake valve timing mechanism 18 and variable exhaust valve timing mechanism 19 changes the relative phase angle of the corresponding camshaft within the range of variability between the most advanced and retarded positions defined by stoppers. Each of variable intake valve timing mechanism 18 and variable exhaust valve timing mechanism 19 may include a lock mechanism configured to mechanically lock the relative phase angle to an intermediate position of the range of variability. Furthermore, such a lock position defined by the lock mechanism may be set to a target phase angle for during the start-up of internal combustion engine 10.

Variable intake valve timing mechanism 18 and variable exhaust valve timing mechanism 19 are controlled by a control device (control means) 20. Control device 20 includes a microcomputer including a CPU, a ROM, a RAM, and the like. Control device 20 receives signals such as the intake cam signal CAMint output by intake cam sensor 15, the exhaust cam signal CAMexh output by exhaust cam sensor 16, the crank angle signal CRANK output by crank angle sensor 17, an engine load signal TP output by an engine load sensor 21 configured to sense a load of internal combustion engine 10, and an engine start-up command signal indicating whether or not this is during the start-up (cranking state) of internal combustion engine 10. Control device 20 outputs an operation signal for variable intake valve timing mechanism 18 and an operation signal for variable exhaust valve timing mechanism 19.

Control device 20 performs feedback control. Specifically, based on comparison between a target relative phase difference and an actual relative phase difference, control device 20 sets the operation variable for variable intake valve timing mechanism 18 and the operation variable for variable exhaust valve timing mechanism 19, and changes these operation variables so as to bring the actual relative phase difference toward the target relative phase difference. Here, control device 20 sets the target phase difference (target intake valve timing) of variable intake valve timing mechanism 18 and the target phase difference (target exhaust valve timing) of variable exhaust valve timing mechanism 19 in a variable manner based on engine operational conditions such as the engine load TP, engine rotation speed NE, and/or whether or not this is during the start-up of internal combustion engine 10.

Furthermore, by using the intake cam signal CAMint, exhaust cam signal CAMexh, and crank angle signal CRANK, control device 20 determines the phase angle of intake camshaft 11 relative to crankshaft 13, and the phase angle of exhaust camshaft 12 relative to crankshaft 13. By measuring the periods (sec) of the crank angle signal CRANK, control device 20 detects a non-pulse region. Then, based on the number of the generated pulses of the crank angle signal CRANK counted after this non-pulse region, control device 20 detects the reference crank angle position REF (reference piston position, e.g., the intake TDC of each cylinder).

In addition, control device 20 measures the angle from the reference crank angle position REF (intake TDC) to the next falling edge of the intake cam signal CAMint as the phase angle of intake camshaft 11 relative to crankshaft 13. Similarly, control device 20 measures the angle from the reference crank angle position REF (intake TDC) to the next falling edge of the exhaust cam signal CAMexh as the phase angle of exhaust camshaft 12 relative to crankshaft 13.

Furthermore, control device 20 has a software-based fail-safe function. In the fail-safe function, control device 20 detects whether or not an abnormality occurs in crank angle sensor 17 (whether the crank angle signal CRANK is behaving normally or abnormally). When detecting an abnormality of crank angle sensor 17 (of the crank angle signal CRANK), control device 20 determines the phase angle of intake camshaft 11 relative to crankshaft 13 based on the cam signals CAMint, CAMexh while fixing the phase angle of exhaust camshaft 12 relative to crankshaft 13 to a reference phase angle that is set by mechanical positioning. Based on the thus-determined relative phase angle and a target phase angle, control device 20 controls variable intake valve timing mechanism 18.

Figure 6:
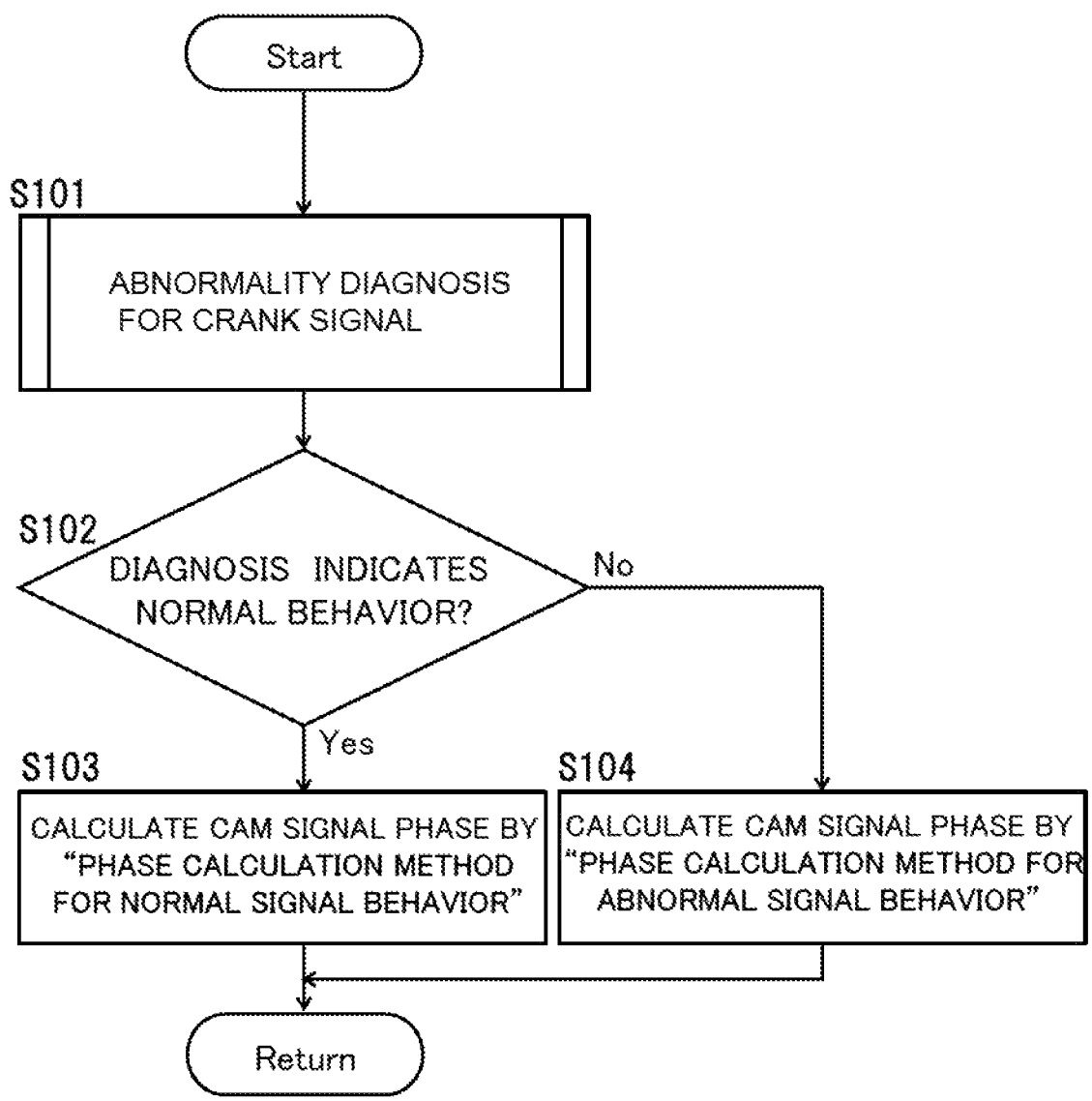
FIG. 6 is a flowchart illustrating the flow of intake phase angle determination processing according to an embodiment of the present invention

Next, with reference to the flowchart of FIG. 6, the control procedure of variable intake valve timing mechanism 18 and variable exhaust valve timing mechanism 19 performed by control device 20 will be described. In step S101, control device 20 first performs abnormality diagnostic processing for detecting whether or not an abnormality occurs in crank angle sensor 17 (whether the crank angle signal CRANK is behaving normally or abnormally).

For example, when the crank angle signal CRANK holds a constant value (high level or low level) for a predefined time or longer; in other words, when the output change (falling) of the crank angle signal CRANK is not detected for a predefined time or longer, control device 20 may determine that the crank angle signal CRANK is behaving abnormally. In addition, control device 20 may compare an actual output pattern of the crank angle signal CRANK with a normal output pattern thereof, and, when detecting that the output of the crank angle signal CRANK changes in a pattern different from the normal output pattern in which the crank angle signal CRANK falls at a constant frequency for 16 consecutive times after the non-pulse region, control device 20 may determine that the crank angle signal CRANK is behaving abnormally. Note that the processing for diagnosing whether or not an abnormality occurs in crank angle sensor 17 is not limited to an example diagnostic processing described above, and may be performed by various known methods.

In step S102, control device 20 decides whether or not an abnormality of the crank angle signal CRANK is detected in the abnormality diagnostic processing in step S101, that is, whether crank angle sensor 17 operates normally or abnormally. When control device 20 decides that crank angle sensor 17 operates normally, the operation proceeds to step S103, in which control device 20 performs normal control (control adapted to normal operation). In the normal control, control device 20 calculates relative phase angles from the intake cam signal CAMint, exhaust cam signal CAMexh, and crank angle signal CRANK, and controls variable intake valve timing mechanism 18 and variable exhaust valve timing mechanism 19 using these relative phase angles.

Figure 7:
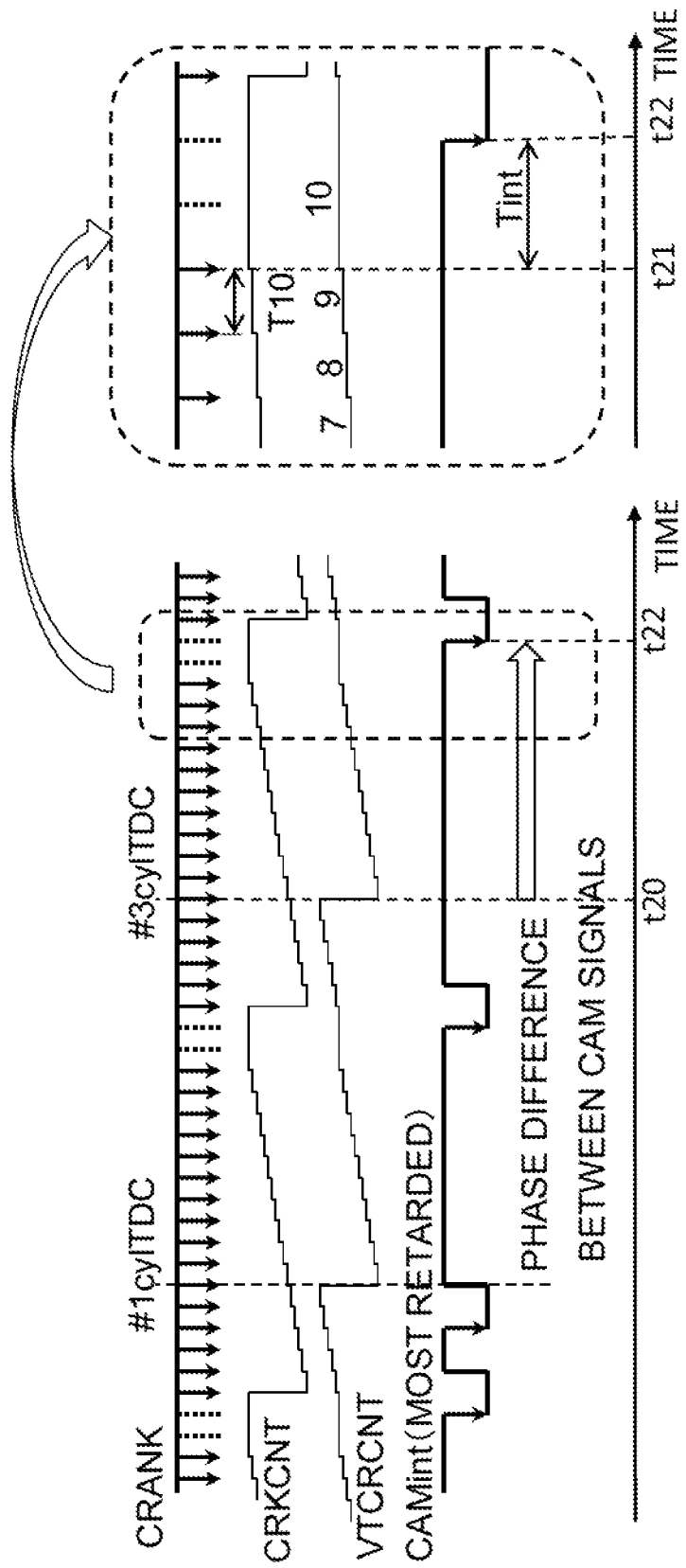
FIG. 7 is a time chart for illustrating the intake phase angle determination processing performed when the crank angle signal CRANK is behaving normally, according to an embodiment of the present invention.

The time chart of FIG. 7 illustrates an example of relative phase angle determination processing performed in the normal control (control adapted to normal operation). To be specific, FIG. 7 illustrates example processing for determining the phase angle of intake camshaft 11 relative to crankshaft 13. The phase angle of exhaust camshaft 12 relative to crankshaft 13 may be determined in a similar manner. By measuring duration of each falling period T10 of the crank angle signal CRANK, control device 20 detects a non-pulse region of the crank angle signal CRANK. Then, control device 20 resets the value of a crank counter CRKCNT to zero at the falling edge of the crank angle signal CRANK immediately after the non-pulse region. After that, each time falling of the crank angle signal CRANK is detected, control device 20 increments the value of the crank counter CRKCNT by 1.

Control device 20 defines the timing when the value of the crank counter CRKCNT reaches a preset value as the reference crank angle position REF, which is used as a reference for measuring the relative phase angle. In the example illustrated in FIG. 7, the timing (time point t20) at which the value of the crank counter CRKCNT becomes 5 corresponds to the position of the intake TDC of each cylinder, and control device 20 sets this intake TDC of each cylinder as the reference crank angle position REF. Control device 20 resets the phase determination crank counter VTCRCNT to zero at the reference crank angle position REF. After that, control device 20 increments the value of the phase determination crank counter VTCRCNT by 1 each time falling of the crank angle signal CRANK is detected.

Then, control device 20 measures the angle from the reference crank angle position REF to the falling edge of the intake cam signal CAMint that is first detected after the reference crank angle position REF, and uses the thus-measured angle as an angle (phase angle) correlated with the phase angle of intake camshaft 11 relative to crankshaft 13. Furthermore, based on the value indicated by the phase determination crank counter VTCRCNT when the falling of the intake cam signal CAMint is detected (at time point t22), that is, the number of generated pulses of the crank angle signal CRANK counted from the reference crank angle position REF to this falling of the intake cam signal CAMint, and time Tint from the falling edge of the crank angle signal CRANK immediately before the falling of the intake cam signal CAMint to the falling edge of the intake cam signal CAMint, control device 20 calculates the phase angle of intake camshaft 11 relative to crankshaft 13 (also referred to as "intake phase angle" below) using the following equation.

Intake Phase Angle (deg)=VTCRCNT×10 (deg)+
   (Tint/T10×10 (deg))

Considering that the crank angle signal CRANK generally falls every 10 degrees of crank angle, "VTCRCNT×10 (deg)" represents a crank angle from the reference crank angle position REF to the falling edge of the crank angle signal CRANK immediately before the next falling of the intake cam signal CAMint (from time point t20 to time point t21), and "Tint/T10×10 (deg)" represents a converted crank angle corresponding to the time Tint from the falling edge of the crank angle signal CRANK immediately before this next falling of the intake cam signal CAMint to this falling edge of the intake cam signal CAMint (from time point t21 to time point t22).

Thus, by calculating and adding up these crank angles, control device 20 determines the angle from the reference crank angle position REF to the next falling edge of the intake cam signal CAMint, and uses this determined angle as the intake phase angle. In a similar manner, control device 20 determines the angle from the reference crank angle position REF to the next falling edge of the exhaust cam signal CAMexh, and uses this determined angle as an exhaust phase angle.

Control device 20 determines the operation variable for variable intake valve timing mechanism 18 and the operation variable for variable exhaust valve timing mechanism 19 so as to bring the thus-determined relative phase angles toward their respective target relative phase angles, and controls variable intake valve timing mechanism 18 and variable exhaust valve timing mechanism 19 based on these operation variables. As described above, when the crank angle signal CRANK is behaving normally, control device 20 calculates crank angles from the reference crank angle position detected based on the crank angle signal CRANK to the next pulses of the cam signals CAMint, CAMexh by combination of crank angle determination based on the number of pulses of the crank angle signal CRANK and crank angle calculation (processing for determining a phase angle less than 10 degrees) of converting a measured time into a crank angle in accordance with information (T10) of the engine rotation speed NE based on the crank angle signal CRANK.

On the other hand, when control device 20 detects an abnormality of crank angle sensor 17 (of the crank angle signal CRANK), the operation proceeds to step S104 in which control device 20 performs fail-safe control. In the fail-safe control, control device 20 determines the phase angle of intake camshaft 11 relative to crankshaft 13 based on the cam signals CAMint, CAMexh while fixing the phase angle of exhaust camshaft 12 relative to crankshaft 13 (variable exhaust valve timing mechanism 19) to the reference phase angle, and controls variable intake valve timing mechanism 18 so as to bring the thus-determined intake phase angle toward the target phase angle.

Here, the reference phase angle of variable exhaust valve timing mechanism 19 is set by mechanical positioning. For example, when the most advanced and retarded positions of variable exhaust valve timing mechanism 19 are defined by stoppers, control device 20 may fix the phase angle of exhaust camshaft 12 relative to crankshaft 13 to the most advanced position, in step S104. Control device 20 controls variable exhaust valve timing mechanism 19 so as to successively generate torque for advancing the relative phase angle so as to maintain the contact state with the stopper defining the most advanced position. That is, this reference phase angle corresponding to the most advanced position is surely achieved by feedforward control by control device 20 even when the relative phase angle cannot be determined.

As an alternative, when an abnormality occurs in crank angle sensor 17 (the crank angle signal CRANK is behaving abnormally), the reference phase angle to which variable exhaust valve timing mechanism 19 is fixed may be set corresponding to the most retarded position. Note, however, that how the phase angle affects the drivability of internal combustion engine 10 differs between when the phase angle is fixed to the angle corresponding to the most retarded position and when the phase angle is fixed to the angle corresponding to the most advanced position. Thus, selecting, as the reference phase angle, an angle closer to the relative phase angle that is assumed to be employed in an internal combustion engine that does not include variable exhaust valve timing mechanism 19 and uses the fixed relative phase angle can suppress drivability deterioration caused by an abnormality.

As another alternative, when variable exhaust valve timing mechanism 19 includes a lock mechanism configured to lock the relative phase angle to a phase angle corresponding to an intermediate position between the most retarded position and the most advanced position, this phase angle to be locked by the lock mechanism may be used as the reference phase angle. For example, such an intermediate phase angle locked by the lock mechanism may be set to a target phase angle for during the start-up of internal combustion engine 10. When variable exhaust valve timing mechanism 19 is fixed to the reference phase angle and the phase angle of exhaust camshaft 12 relative to crankshaft 13 is fixed to a known phase angle as described above, the crank angle position at which the exhaust cam signal CAMexh outputs a pulse (falls) is fixed to a known crank angle. Thus, the phase difference between the exhaust cam signal CAMexh and intake cam signal CAMint may be changed by adjustment of the relative phase angle made by variable intake valve timing mechanism 18. This allows control device 20 to determine the phase angle of intake camshaft 11 relative to crankshaft 13 (intake phase angle) based on the phase difference between the exhaust cam signal CAMexh and the intake cam signal CAMint.

Figure 8:
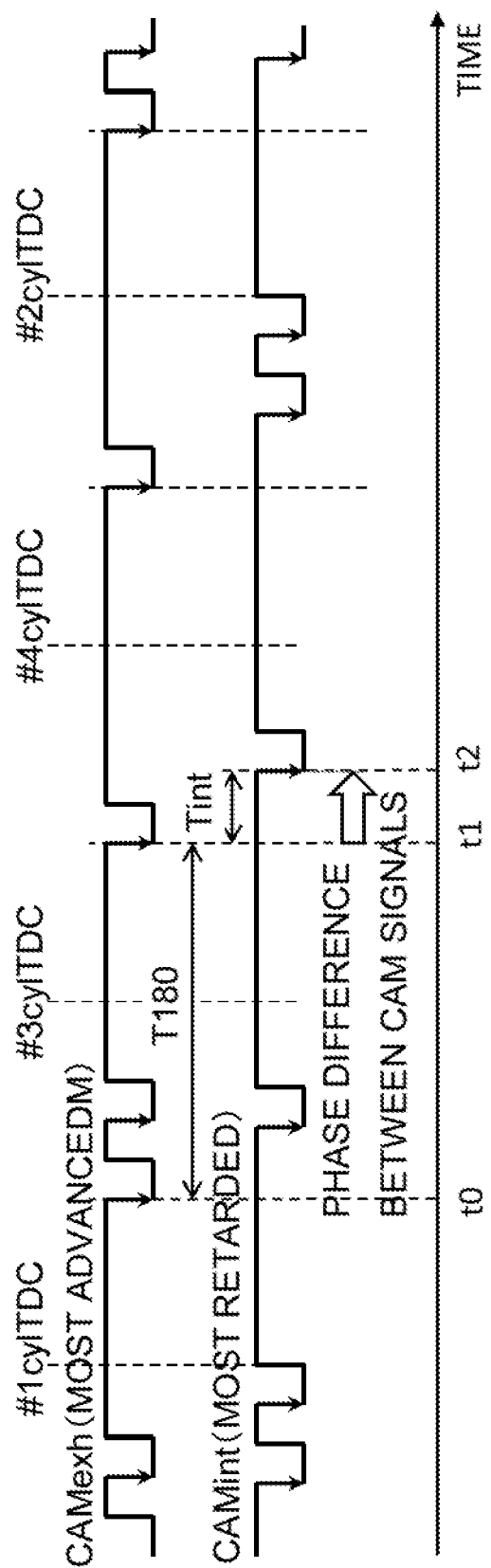
FIG. 8 is a time chart for illustrating the intake phase angle determination processing performed when the crank angle signal CRANK is behaving abnormally, according to an embodiment of the present invention.

The time chart of FIG. 8 illustrates processing for determining an angle correlated with the phase angle of intake camshaft 11 relative to crankshaft 13 based on the phase difference between the exhaust cam signal CAMexh and the intake cam signal CAMint. In FIG. 8, when variable exhaust valve timing mechanism 19 is fixed to the reference phase angle (most advanced position), the exhaust cam signal CAMexh falls at a predetermined crank angle between each adjacent two of the intake TDCs of the cylinders.

Control device 20 measures the time Tint (sec) from the falling edge (the falling edge of the first one of the two consecutive pulses) of the exhaust cam signal CAMexh to the next falling edge of the intake cam signal CAMint. At the end (time point t2) of the time Tint, control device 20 converts the time Tint into a crank angle based on the falling period T180 (*sec*) of the exhaust cam signal CAMexh and uses this crank angle as an angle correlated with the phase angle of intake camshaft 11 relative to crankshaft 13.

$$\text{Intake Phase Angle} = T\text{int}/T180 \times 180 \text{ (deg)} \qquad \text{Equation (1)}$$

Here, the falling period T180 of the exhaust cam signal CAMexh corresponds to time taken for exhaust camshaft 12 to rotate by 90 degrees. Furthermore, considering that 90-degree rotation of exhaust camshaft 12 corresponds to 180-degree rotation of crankshaft 13, the falling period T180 of the exhaust cam signal CAMexh corresponds to time taken for crankshaft 13 to rotate by 180 degrees.

Accordingly, "Tint/T180" represents a ratio of the time Tint of phase difference (referred to as phase difference time Tint, below) to the time taken for crankshaft 13 to rotate by 180 degrees. Thus, multiplying this ratio by 180 (deg) gives a crank angle converted from the phase difference time Tint. Note that the value of the falling period T180 of the exhaust cam signal CAMexh used in the calculation of the intake phase angle at time point t2 is the time from time point t0 to time point t1, which is updated at time point t1.

Here, the shorter the phase difference time Tint is, in other words, the shorter the time Tint from the falling edge of the exhaust cam signal CAMexh to the next falling edge of the intake cam signal CAMint, the more recently obtained data of the period T180 is used to convert the phase difference time Tint into a crank angle (intake phase angle), and thus, the more precisely the crank angle (intake phase angle) may be converted from the phase difference time Tint. In particular, during the start-up of internal combustion engine 10, the rotation speed of internal combustion engine 10 changes greatly. Thus, a longer time interval (i.e., longer phase difference time Tint) from the last update of the period T180 to conversion of the phase difference time Tint into the crank angle (intake phase angle) reduces the determination accuracy of the intake phase angle.

As described above, as the phase difference time Tint is shorter, the determined intake phase angle is more accurate. Furthermore, during the start-up of internal combustion engine 10 in which the rotation speed of the engine rotation speed changes greatly, the determination accuracy of the intake phase angle is more likely to be deteriorated than after the engine start-up. Accordingly, the pulse output timings of the exhaust cam signal CAMexh and the intake cam signal CAMint are set in the following manner. When the intake phase angle is set to the target value for during the start-up of internal combustion engine 10 and the exhaust phase angle is set to the reference phase angle, the phase difference angle (deg) between the exhaust cam signal CAMexh and the intake cam signal CAMint takes the minimum. After the engine start-up, the target value of the intake phase angle is changed while the exhaust phase angle is held at the reference phase angle, and the phase difference angle between the exhaust cam signal CAMexh and the intake cam signal CAMint increases as compared to during the engine start-up.

Figure 9:
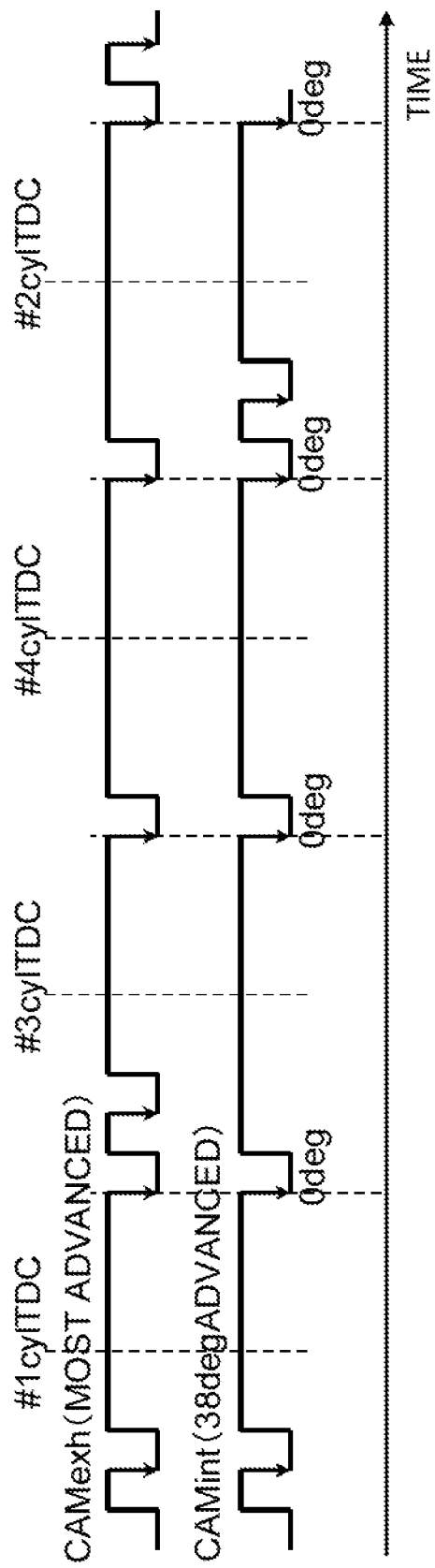
FIG. 9 is a time chart illustrating output characteristics of the intake cam signal CAMint and exhaust cam signal CAMexh during the engine start-up when the crank angle signal CRANK is behaving abnormally, according to an embodiment of the present invention.

Specifically, variable intake valve timing mechanism 18 and variable exhaust valve timing mechanism 19 may be configured such that, when the intake phase angle is set to the target value for during the start-up of internal combustion engine 10 and the exhaust phase angle is set to the reference phase angle, the exhaust cam signal CAMexh is in phase with the intake cam signal CAMint (the falling edges, each corresponding to every 180 degrees of crank angle, of these pulse signals coincide with each other), as illustrated in FIG. 9. Alternatively, variable intake valve timing mechanism 18 and variable exhaust valve timing mechanism 19 may be configured such that, when the intake phase angle is set to the target value for during the start-up of internal combustion engine 10 and the exhaust phase angle is set to the reference phase angle, the phase difference angle (deg) between the exhaust cam signal CAMexh and the intake cam signal CAMint is equal to or less than the falling period (deg) of the crank angle signal CRANK.

For example, when the falling period (deg) of the crank angle signal CRANK is 10 degrees, variable intake valve timing mechanism 18 and variable exhaust valve timing mechanism 19 may be configured such that, when the intake phase angle is set to the target value for during the start-up of internal combustion engine 10 and the exhaust phase angle is set to the reference phase angle, the phase difference angle (deg) between the exhaust cam signal CAMexh and the intake cam signal CAMint is greater than 0 degrees and less than or equal to 10 degrees. In such a configuration in which the phase difference angle between the exhaust cam signal CAMexh and the intake cam signal CAMint is equal to or less than the falling period (deg) of the crank angle signal CRANK (including that it may be 0 degrees) when the intake phase angle is set to the target value for during the start-up of internal combustion engine 10 and the exhaust phase angle is set to the reference phase angle, the time interval from the last update of the rotation speed (update of the data indicating the duration of the falling period) used for conversion of the phase difference time Tint (sec) into a crank angle to actual calculation for this conversion is reduced to as low as when the crank angle signal CRANK is behaving normally. Thus, this configuration suppresses deterioration in the calculation accuracy of the intake phase angle even during the engine start-up in which the engine rotation speed changes greatly.

When variable intake valve timing mechanism 18 includes a lock mechanism that is configured to lock the intake phase angle to a target phase angle for during the engine start-up, variable intake valve timing mechanism 18 may be configured such that, when the intake phase angle is locked by the lock mechanism and the exhaust phase angle is set to the reference phase angle, the phase difference angle between the exhaust cam signal CAMexh and the intake cam signal CAMint takes the minimum. Here, the example of FIG. 8 illustrates the case in which the intake cam signal CAMint falls immediately after the falling of the exhaust cam signal CAMexh. In this case, the phase difference time Tint increases when the intake phase angle is retarded after the engine start-up. This means that older rotation speed data is used for the time-to-crank-angle conversion. In other words, retarding the intake phase angle increases the time interval from the last update of the rotation speed data to conversion of the phase difference time Tint into the crank angle.

Figure 10:
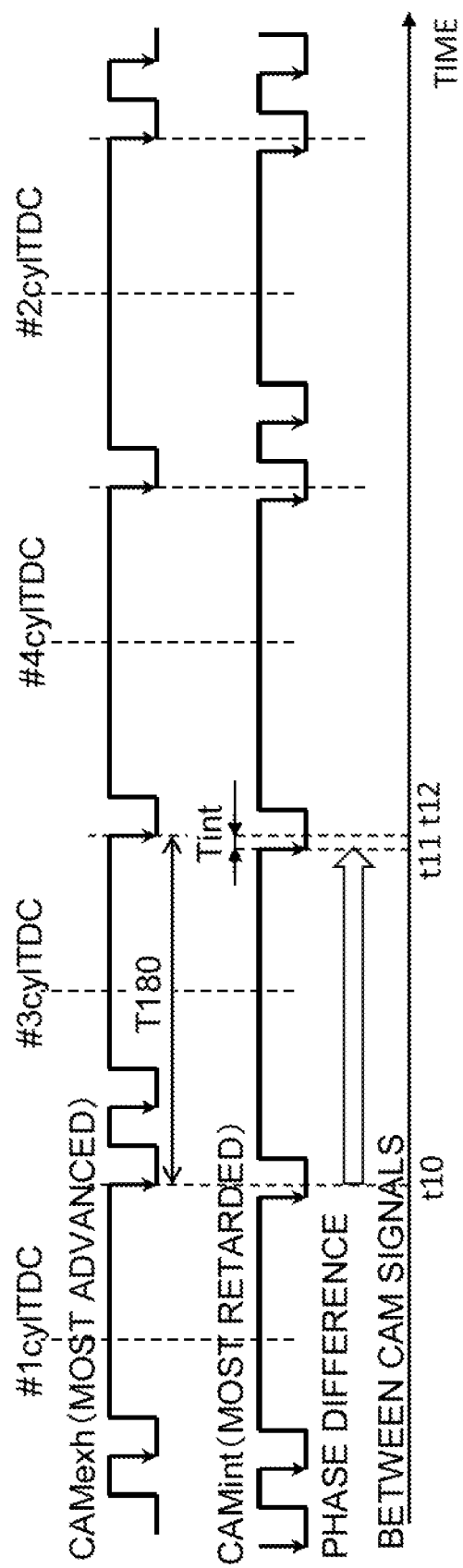
FIG. 10 is a time chart for illustrating the intake phase angle determination processing performed when the crank angle signal CRANK is behaving abnormally, according to an embodiment of the present invention.

However, the change in engine rotation speed after the engine start-up is smaller (slower) than during the engine start-up. This compensates for an effect caused by an increase in time interval from the last update of the rotation speed data to the conversion of the phase difference time Tint into the crank angle, and suppresses deterioration in the calculation accuracy of the intake phase angle after the engine start-up. During the engine start-up, a setting as illustrated in FIG. 10 may be employed in which the exhaust cam signal CAMexh falls immediately after the falling of the intake cam signal CAMint. In this case, control device 20 may measure the phase difference time Tint from the intake cam signal CAMint to the exhaust cam signal CAMexh (time from time point t11 to time point t12), and calculates an angle correlated to the phase angle of intake camshaft 11 relative to crankshaft 13 using the following equation, at time point t12 corresponding to the falling edge of the exhaust cam signal CAMexh.

$$\text{Intake Phase Angle} = 180 \text{ (deg)} - (\text{Tint}/T180 \times 180 \text{ (deg)}) \quad \text{Equation (2)}$$

Note that time point t12 corresponds to the falling edge of the exhaust cam signal CAMexh, and the falling period T180 of the exhaust cam signal CAMexh is updated at time point t12. At this time point t12, control device 20 converts the phase difference time Tint into a crank angle based on the period T180, which represents time from time point t10 to time point t12.

Each of Equations (1) and (2) gives, as the intake phase angle, an angle from the falling edge of the exhaust cam signal CAMexh to the next falling edge of the intake cam signal CAMint. Assume here that, when the intake cam signal CAMint and the exhaust cam signal CAMexh have a phase relationship as illustrated in FIG. 10, control device 20 measures, as the phase difference time Tint, a time interval from the falling edge of the exhaust cam signal CAMexh to the next falling edge of the intake cam signal CAMint, and calculates the intake phase angle using Equation (1) at time point t11. In this case, the thus-determined intake phase angle contains a significant error.

Specifically, in this case, the data of the falling period T180 used in calculating the intake phase angle at the time point t11 in FIG. 10 represents the value updated at the time point t10. Thus, the time interval from the last update of data of the period T180 to the calculation of the intake phase angle in Equation (1) is longer than that in Equation (2). This means that the phase difference time Tint is converted into a crank angle based on the data of the period T180 that contains a large error from the actual engine rotation speed NE, and thus means that the resultant intake phase angle contains a significant error. Thus, when the setting as illustrated in FIG. 10 is employed in which the exhaust cam signal CAMexh falls immediately after the falling of the intake cam signal CAMint during the engine start-up, control device 20 determines the intake phase angle by the aforementioned method to reduce deterioration in the determination accuracy of the phase difference angle. Specifically, in this case, control device 20 determines the phase difference angle by measuring the phase difference time Tint from the intake cam signal CAMint to the exhaust cam signal CAMexh, and converting the phase difference time Tint into a crank angle. Furthermore, control device 20 subtracts, from 180 degrees, the angle calculated from the phase difference time Tint, and uses this angle difference as the intake phase angle, which is an angle from the exhaust cam signal CAMexh (reference crank angle position) to the intake cam signal CAMint, as in FIG. 8.

In other words, considering comparison between the phase difference time Tint from the intake cam signal CAMint to the exhaust cam signal CAMexh with the phase difference time Tint from the exhaust cam signal CAMexh to the intake cam signal CAMint, control device 20 determines an intake phase angle by converting the smaller of these values of phase difference time Tint into a crank angle. In the above configuration, control device 20 measures the output period (T180) of the exhaust cam signal CAMexh as a parameter corresponding to the rotation speed of internal combustion engine 10. Alternatively, however, the output period (T180) of the intake cam signal CAMint may be measured as a parameter corresponding to the rotation speed of internal combustion engine 10. When the rotation speed of internal combustion engine 10 is determined based on the intake cam signal CAMint, the intake cam signal CAMint shall be replaced with the exhaust cam signal CAMexh, and the exhaust cam signal CAMexh shall be replaced with the intake cam signal CAMint in FIGS. 8 and 10. This alternative configuration also provides the same effects as when the rotation speed of internal combustion engine 10 is determined based on the exhaust cam signal CAMexh.

That is, control device 20 may calculate the rotation speed of internal combustion engine 10 using either one of the intake cam signal CAMint and exhaust cam signal CAMexh. Furthermore, when the cam signal that is used for the calculation (referred to as first cam signal, below) is output immediately after the other cam signal (referred to as second cam signal, below), control device 20 may measure a phase difference time Tint from the output of the second cam signal to the output of the first cam signal. On the other hand, when the first cam signal is output immediately before the second cam signal, control device 20 may measure a phase difference time Tint from the output of the first cam signal to the output of the second cam signal. Then, control device 20 converts the thus-measured phase difference time Tint into a crank angle based on the rotation speed of internal combustion engine 10.

Although the present invention has been described in detail with reference to the preferred embodiment, it is apparent that the invention may be modified in various ways by one skilled in the art based on the fundamental technical concept and teachings of the invention. For example, crank angle sensor 17 may be configured to output the crank angle signal CRANK for each predetermined crank angle degree (each detection of a predetermined angle degree) without exception, i.e., without any non-pulse region, and an additional separate sensor configured to output a reference crank angle signal may be provided.

The output pattern repeated by each of the intake cam signal CAMint and the exhaust cam signal CAMexh is not limited to a pattern in which one pulse, one pulse, two pulses, and two pulses are output every 180 degrees of crank angle in this order. Furthermore, internal combustion engine 10 is not limited to a four-stroke inline four-cylinder internal combustion engine. The present invention may also be applied to an internal combustion engine such as an inline or V-shaped six-cylinder internal combustion engine.

Furthermore, when an abnormality occurs in crank angle sensor 17 (the crank angle signal CRANK is behaving abnormally), control device 20 may warn the driver of the vehicle having internal combustion engine 10 about the occurrence of an abnormality. In addition, when an abnormality occurs in crank angle sensor 17 (the crank angle signal CRANK is behaving abnormally), control device 20 may limit the range of variability of the phase angle of intake camshaft 11 relative to crankshaft 13 governed by variable intake valve timing mechanism 18 to a narrower range than when crank angle sensor 17 operates normally.

The technical concepts which can be grasped from the above embodiment will be disclosed below. A control device for an internal combustion engine according to an aspect includes: a variable intake valve timing mechanism configured to variably control a phase angle of an intake camshaft relative to a crankshaft; a variable exhaust valve timing mechanism configured to variably control a phase angle of an exhaust camshaft relative to the crankshaft; an intake cam sensor configured to output an intake cam signal at a predetermined rotational position of the intake camshaft; an exhaust cam sensor configured to output an exhaust cam signal at a predetermined rotational position of the exhaust camshaft; and a crank angle sensor configured to output a crank angle signal at a predetermined rotational position of the crankshaft. The control device comprises a control means configured to: control the variable intake valve timing mechanism based on the crank angle signal and the intake cam signal, when the crank angle signal is behaving normally; and control the variable intake valve timing mechanism based on the intake cam signal and the exhaust cam signal while controlling the variable exhaust valve timing mechanism so as to set the relative phase angle of the exhaust camshaft to a reference phase angle, when the crank angle signal is behaving abnormally. The control device is configured such that a phase difference between the exhaust cam signal generated when the relative phase angle of the exhaust camshaft is set to the reference phase angle and the intake cam signal generated when the relative phase angle of the intake camshaft is set to a target value is greater after a start-up of the internal combustion engine than during the start-up.

In a preferred aspect of the control device for the internal combustion engine, the crank angle sensor outputs the crank angle signal for each predetermined rotation angle degree of the crankshaft. Furthermore, the phase difference between the exhaust cam signal generated when the relative phase angle of the exhaust camshaft is set to the reference phase angle and the intake cam signal generated when the relative phase angle of the intake camshaft is set to a target value is less than or equal to the predetermined angle degree of rotation during the start-up of the internal combustion engine.

In another preferred aspect, the exhaust cam signal generated when the relative phase angle of the exhaust camshaft is set to the reference phase angle is in phase with the intake cam signal generated when the relative phase angle of the intake camshaft is set to a target value for during the start-up of the internal combustion engine. In still another preferred aspect, the reference phase angle of the exhaust camshaft is a relative phase angle of the exhaust camshaft that is set by mechanical positioning in the variable exhaust valve timing mechanism.

In still another preferred aspect, the control means calculates a rotation speed of the internal combustion engine based on the crank angle signal, when the crank angle signal is behaving normally. On the other hand, the control means calculates a rotation speed of the internal combustion engine based on the intake cam signal or the exhaust cam signal, when the crank angle signal is behaving abnormally. The control means converts time of phase difference into a crank angle based on the rotation speed of the internal combustion engine. In still another preferred aspect, when the control means calculates the rotation speed of the internal combustion engine based on the intake cam signal or the exhaust cam signal, the control means measures the time of phase difference as follows. Below, one of the cam signals that is used for the calculation will be referred to as a first cam signal, and the other cam signal will be referred to a second cam signal. In this case, the control means measures time of phase difference from an output of the second cam signal to an output of the first cam signal, when the first cam signal is output immediately after the second cam signal. On the other hand, the control means measures time of phase difference from an output of the first cam signal to an output of the second cam signal, when the first cam signal is output immediately before the second cam signal. Furthermore, the control unit converts the measured time of phase difference into a crank angle based on the rotation speed of the internal combustion engine.

A control device for an internal combustion engine according to an aspect includes: a variable intake valve timing mechanism configured to variably control a phase angle of an intake camshaft relative to a crankshaft; a variable exhaust valve timing mechanism configured to variably control a phase angle of an exhaust camshaft relative to the crankshaft; an intake cam sensor configured to output an intake cam signal at a predetermined rotational position of the intake camshaft; an exhaust cam sensor configured to output an exhaust cam signal at a predetermined rotational position of the exhaust camshaft; and a crank angle sensor configured to output a crank angle signal for each predetermined rotation angle degree of the crankshaft. The control device is configured such that a phase difference between the exhaust cam signal generated when the relative phase angle of the exhaust camshaft is set to the reference phase angle and the intake cam signal generated when the relative phase angle of the intake camshaft is set to a target value is less than or equal to the predetermined rotation angle degree during a start-up of the internal combustion engine. Here, the reference phase angle is a relative phase angle of the exhaust camshaft that is set by mechanical positioning.

A control device for an internal combustion engine according to an aspect includes: a variable intake valve timing mechanism configured to variably control a phase angle of an intake camshaft relative to a crankshaft; a variable exhaust valve timing mechanism configured to variably control a phase angle of an exhaust camshaft relative to the crankshaft; an intake cam sensor configured to output an intake cam signal at a predetermined rotational position of the intake camshaft; an exhaust cam sensor configured to output an exhaust cam signal at a predetermined rotational position of the exhaust camshaft; and a crank angle sensor configured to output a crank angle signal for each predetermined rotation angle degree of the crankshaft. The control device is configured such that the exhaust cam signal generated when the relative phase angle of the exhaust camshaft is set to the reference phase angle is in phase with the intake cam signal generated when the relative phase angle of the intake camshaft is set to a target value for during the start-up of the internal combustion engine. Here, the reference phase angle is a relative phase angle of the exhaust camshaft that is set by mechanical positioning.

A control device for an internal combustion engine according to an aspect includes: a variable intake valve timing mechanism configured to variably control a phase angle of an intake camshaft relative to a crankshaft; a variable exhaust valve timing mechanism configured to variably control a phase angle of an exhaust camshaft relative to the crankshaft; an intake cam sensor configured to output an intake cam signal at a predetermined rotational position of the intake camshaft; an exhaust cam sensor configured to output an exhaust cam signal at a predetermined rotational position of the exhaust camshaft; and a crank angle sensor configured to output a crank angle signal at a predetermined rotational position of the crankshaft. The control device comprises a control means configured to control the variable intake valve timing mechanism based on the intake cam signal and the exhaust cam signal while controlling the variable exhaust valve timing mechanism so as to set the relative phase angle of the exhaust camshaft to a reference phase angle, when the crank angle signal is behaving abnormally. When the control means calculates the rotation speed of the internal combustion engine based on the intake cam signal or the exhaust cam signal, the control means measures time of phase difference as follows. Below, one of the cam signals that is used for the calculation will be referred to as a first cam signal, and the other cam signal will be referred to a second cam signal. In this case, the control means measures time of phase difference from an output of the second cam signal to an output of the first cam signal, when the first cam signal is output immediately after the second cam signal. On the other hand, the control means measures time of phase difference from an output of the first cam signal to an output of the second cam signal, when the first cam signal is output immediately before the second cam signal. Furthermore, the control unit converts the measured time of phase difference into a crank angle based on the rotation speed of the internal combustion engine.

A control method for an internal combustion engine according to an aspect includes: a variable intake valve timing mechanism configured to variably control a phase angle of an intake camshaft relative to a crankshaft; a variable exhaust valve timing mechanism configured to variably control a phase angle of an exhaust camshaft relative to the crankshaft; an intake cam sensor configured to output an intake cam signal at a predetermined rotational position of the intake camshaft; an exhaust cam sensor configured to output an exhaust cam signal at a predetermined rotational position of the exhaust camshaft; and a crank angle sensor configured to output a crank angle signal at a predetermined rotational position of the crankshaft. The control method comprises the steps of: detecting whether the crank angle signal is behaving normally or abnormally; controlling the variable intake valve timing mechanism based on the crank angle signal and the intake cam signal, when the crank angle signal is behaving normally; controlling the variable exhaust valve timing mechanism based on the crank angle signal and the exhaust cam signal, when the crank angle signal is behaving normally; controlling the variable exhaust valve timing mechanism so as to set the relative phase angle of the exhaust camshaft to a reference phase angle, when the crank angle signal is behaving abnormally; and controlling the variable intake valve timing mechanism based on the intake cam signal and the exhaust cam signal, when the crank angle signal is behaving abnormally. In the control method, a phase difference between the exhaust cam signal generated when the relative phase angle of the exhaust camshaft is set to the reference phase angle and the intake cam signal generated when the relative phase angle of the intake camshaft is set to a target value is greater after a start-up of the internal combustion engine than during the start-up.

REFERENCE SYMBOL LIST

10 Internal combustion engine
11 Intake camshaft
12 Exhaust camshaft
13 Crankshaft
15 Intake cam sensor
16 Exhaust cam sensor
17 Crank angle sensor
18 Variable intake valve timing mechanism
19 Variable exhaust valve timing mechanism
20 Control device

The invention claimed is:

1. A control device for an internal combustion engine including: a variable intake valve timing mechanism configured to variably control a phase angle of an intake camshaft relative to a crankshaft; a variable exhaust valve timing mechanism configured to variably control a phase angle of an exhaust camshaft relative to the crankshaft; an intake cam sensor configured to output an intake cam signal at a predetermined rotational position of the intake camshaft; an exhaust cam sensor configured to output an exhaust cam signal at a predetermined rotational position of the exhaust camshaft; and a crank angle sensor configured to output a crank angle signal at a predetermined rotational position of the crankshaft, the internal combustion engine being configured such that each of the intake cam signal and the exhaust cam signal has a period longer than a period of the crank angle signal, the control device comprising a control unit configured to:
control the variable intake valve timing mechanism based on the crank angle signal and the intake cam signal, when the crank angle signal is behaving normally; and
control the variable intake valve timing mechanism based on the intake cam signal and the exhaust cam signal while controlling the variable exhaust valve timing mechanism so as to set the relative phase angle of the exhaust camshaft to a reference phase angle, when the crank angle signal is behaving abnormally,
wherein a phase difference between the exhaust cam signal generated when the relative phase angle of the exhaust camshaft is set to the reference phase angle and the intake cam signal generated when the relative phase angle of the intake camshaft is set to a target value is greater after a start-up of the internal combustion engine than during the start-up, and wherein the phase difference during the start-up of the internal combustion engine is less than or equal to the period of the crank angle signal.

2. The control device for the internal combustion engine according to claim 1, wherein the exhaust cam signal generated when the relative phase angle of the exhaust camshaft is set to the reference phase angle is in phase with the intake cam signal generated when the relative phase angle of the intake camshaft is set to a target value for during the start-up of the internal combustion engine.

3. The control device for the internal combustion engine according to claim 1, wherein the reference phase angle of the exhaust camshaft is a relative phase angle of the exhaust camshaft that is set by mechanical positioning in the variable exhaust valve timing mechanism.

4. The control device for the internal combustion engine according to claim 1,
wherein the control unit calculates a rotation speed of the internal combustion engine based on the crank angle signal, when the crank angle signal is behaving normally, and based on the intake cam signal or the exhaust cam signal, when the crank angle signal is behaving abnormally, and
wherein the control unit converts time of phase difference into a crank angle based on the rotation speed of the internal combustion engine.

5. The control device for the internal combustion engine according to claim 4,
wherein, when the control unit calculates the rotation speed of the internal combustion engine based on the intake cam signal or the exhaust cam signal, one of the cam signals that is used for the calculation being a first cam signal, the other cam signal being a second cam signal,
the control unit measures time of phase difference from an output of the second cam signal to an output of the first cam signal, when the first cam signal is output immediately after the second cam signal, and
the control unit measures time of phase difference from an output of the first cam signal to an output of the second cam signal, when the first cam signal is output immediately before the second cam signal, and
wherein the control unit converts the measured time of phase difference into a crank angle based on the rotation speed of the internal combustion engine.

6. A control method for an internal combustion engine including: a variable intake valve timing mechanism configured to variably control a phase angle of an intake camshaft relative to a crankshaft; a variable exhaust valve timing mechanism configured to variably control a phase angle of an exhaust camshaft relative to the crankshaft; an intake cam sensor configured to output an intake cam signal at a predetermined rotational position of the intake camshaft; an exhaust cam sensor configured to output an exhaust cam signal at a predetermined rotational position of the exhaust camshaft; and a crank angle sensor configured to output a crank angle signal at a predetermined rotational position of the crankshaft, the internal combustion engine being configured such that each of the intake cam signal and the exhaust cam signal has a period longer than a period of the crank angle signal, the control method comprising the steps of:
detecting whether the crank angle signal is behaving normally or abnormally;
controlling the variable intake valve timing mechanism based on the crank angle signal and the intake cam signal, when the crank angle signal is behaving normally;
controlling the variable exhaust valve timing mechanism based on the crank angle signal and the exhaust cam signal, when the crank angle signal is behaving normally;
controlling the variable exhaust valve timing mechanism so as to set the relative phase angle of the exhaust camshaft to a reference phase angle, when the crank angle signal is behaving abnormally; and
controlling the variable intake valve timing mechanism based on the intake cam signal and the exhaust cam signal, when the crank angle signal is behaving abnormally,
wherein a phase difference between the exhaust cam signal generated when the relative phase angle of the exhaust camshaft is set to the reference phase angle and the intake cam signal generated when the relative phase angle of the intake camshaft is set to a target value is greater after a start-up of the internal combustion engine than during the start-up, and
wherein the phase difference during the start-up of the internal combustion engine is less than or equal to the period of the crank angle signal.

* * * * *